Oct. 15, 1957

J. R. LAWRENCE 2,809,580

DOUBLE GRID BROILER, TOASTER OR THE
LIKE, AND METHOD OF MAKING SAME

Filed March 24, 1954

INVENTOR
John Richard Lawrence
George H. Kennedy Jr.
Atty.

INVENTOR
John Richard Lawrence

Patent text

2,809,580

DOUBLE GRID BROILER, TOASTER OR THE LIKE, AND METHOD OF MAKING SAME

John Richard Lawrence, Worcester, Mass., assignor to The Washburn Company, Worcester, Mass., a corporation of Massachusetts Application March 24, 1954, Serial No. 418,298

2 Claims. (Cl. 99—402)

This invention relates to improvements in the construction and manufacture of broilers, toasters and similar devices of the type adapted to grip a piece of meat or other food products between a pair of opposed wire grills or grids.

In conventional broilers and toasters of this two-grill type, it is the customary practice to run the wires of one grill at right angles to the wires of the opposed grill in order to obtain, between the opposed upper and lower sets of wires, an evenly distributed multiplicity of crossings, so as to resist in all directions any slippage of the interposed food. This prior art 90° orientation of the wires of the respective grill members imposes increased costs in the manufacture of double grid broilers, toasters, etc., since separate and different facilities (welding jigs and the like) are required for the uniting of the wires of the respective grill members to their frames.

My invention, as hereinafter described, provides a double grid broiler or toaster which obtains this same evenly distributed multiplicity of crossings between the opposed upper and lower sets of grid wires, but nevertheless permits the wires of both grill members to run in the same direction. This latter feature enables both grills of my broiler or toaster to be constructed, as hereinafter described, as substantial duplicates of one another, using a single welding jig for the construction of both members.

Other and further advantageous features of this invention will hereinafter more fully appear from a detailed description of the drawings in which Fig. 1 is a diagrammatic plan view of my improved broiler or toaster, showing the two grids thereof in their opened-up inoperative positions.

Figure 1:
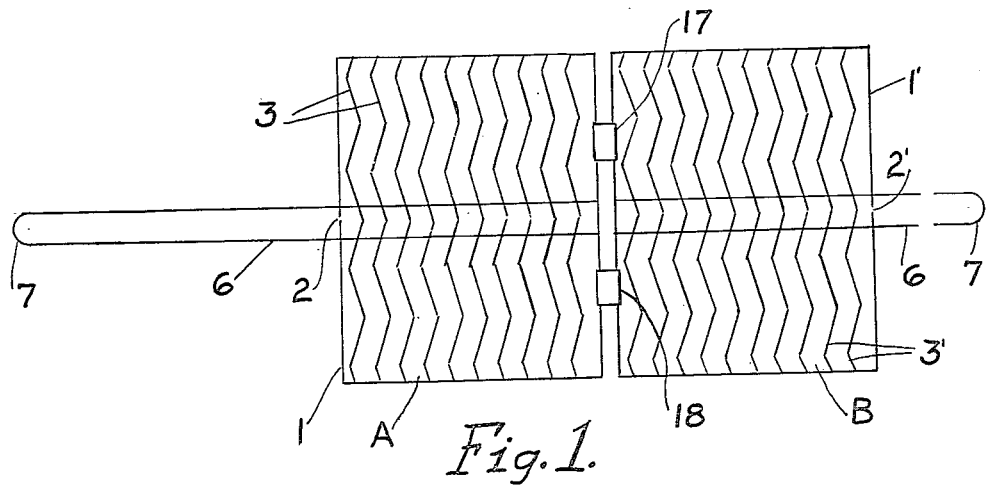
Figures 2, 3:
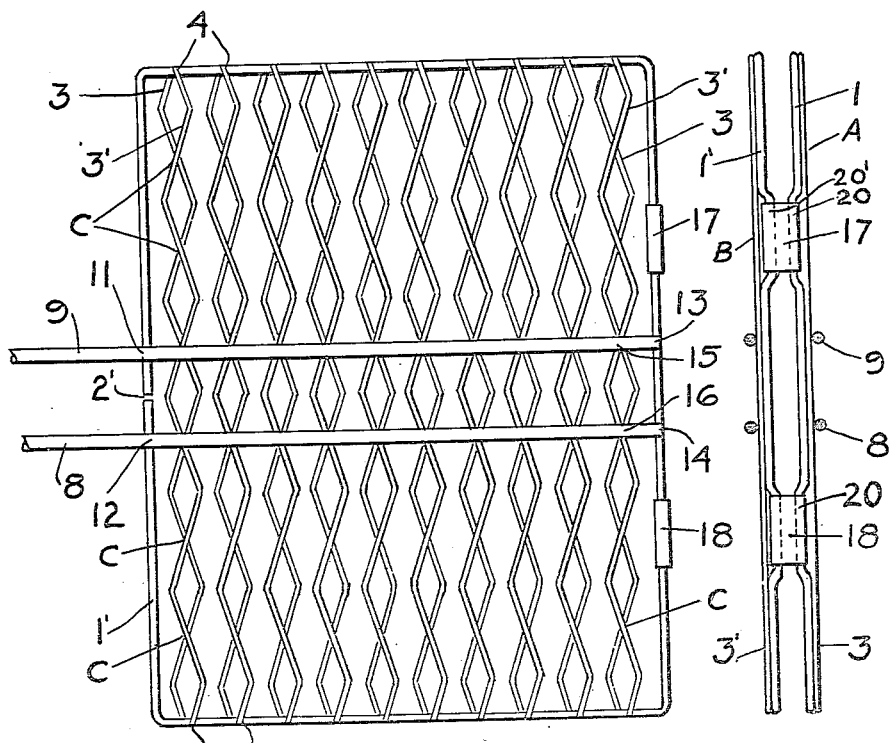
Fig. 2 is a larger scale plan view, showing the multiplicity of crossings of the upper and lower grid wires when the two grids are folded together, in their operative positions.
Fig. 3 is a side elevation of Fig. 2.

My improved broiler or toaster (Figs. 1, 2 and 3) provides a pair of companion hinged-together grids, designated A and B in Fig. 1, which are of equal size and similar construction. Grid A has a frame 1, made by bending into rectangular form a single length of relatively heavy wire, whose ends are brought into substantially abutting relation at a narrow gap 2 located midway of one long side of the rectangle. In the fabrication of frame 1, its opposite long side, as best shown in Fig. 3, is formed with a pair of spaced lateral offsets 20, 20, for a purpose to be hereinafter described. Running lengthwise of frame 1, and on the opposite face thereof from offsets 20, 20, are a plurality of equally-spaced parallel zigzag wires 3, 3 of somewhat lighter gauge than the frame wire, the ends of these grid wires 3, 3 being welded at 4 and 5 to the opposite ends of frame 1.

As shown in Fig. 1, the companion grid B is substantially identical with the above-described grid A. That is to say, grid B has a rectangular wire frame 1', with a narrow gap 2' in one of its longer sides, and with its opposite longer side formed with spaced lateral offsets 20', 20' that match the corresponding lateral offsets 20, 20 of frame 1. These two pairs of matching frame member offsets are brought into opposed relation (see Fig. 3, so as to serve for the hinging together of the two frames 1 and 1', by means of suitable hinge members 17 and 18. The latter are here shown as rectangular pieces of flat metal stock, of slightly less width than the length of each frame member offset, and having their respective end portions bent or looped around each opposed pair of offsets 20, 20', to provide the required articulation between the hinge member and each of the so-connected grid frames 1 and 1', in the absence of opportunity for undue endwise displacement of said hinge members 17 and 18.

The frame 1', on the opposite face thereof from its hinge offsets 20', 20', carries a plurality of lengthwise-running parallel zigzag grid wires 3', 3', having their ends welded at 4 and 5 to the ends of said frame 1'. These grid wires 3', 3', are identical, in configuration, number, spacing and arrangement with the zigzag grid wires 3, 3 of frame 1 of the companion grid A. Furthermore, it is particularly to be noted that with the hinged-together grids A and B in side-by-side relation (the broiler's opened-up or inoperative condition which is shown in Fig. 1), not only are the two sets of grid wires in parallelism, but the wires 3', 3', from left to right, have exactly the same orientation with their frame member 1' as have the wires 3, 3, from left to right, with their frame member 1. This clearly appears from a consideration of Fig. 1 with the hinge members 17 and 18 removed; if grid B in that situation is shifted leftward until its frame 1' directly overlies frame 1 of grid A, then all of the zigzag grid wires 3', 3' will be in exact registry with the respective corresponding zigzag grid wires 3, 3 of the other frame 1.

In short, although the two frame members 1 and 1' of grids A and B are connected as shown in parallel, nevertheless said two grids, from the standpoint of their respective sets of zigzag wires 3, 3 and 3', 3', are in fact connected together in series by the hinge members 17 and 18. Thus it is, that when said two grids A and B, by movement about said hinge members from the positions of Fig. 1, are folded together one upon the other for the retention between them of interposed food, as depicted in Fig. 2, each zigzag wire 3' of grid B will always occupy a non-registering and wholly out-of-phase relation to the zigzag wire 3 directly beneath it in the gird A. Actually, between every such upper wire 3 and its corresponding lower wire 3, there will be numerous crossings C, C, as shown in Fig. 2, and these crossings, because of being distributed in uniform fashion over the whole area of the closed broiler or toaster, are highly effective for the firm holding of all food interposed between the two grids A and B.

Each of said grids is here shown as equipped in customary fashion with a suitable handle 6, by which to effect its movement about the hinge members 17, 18, as well as to serve, in the broiler's operative position (Fig. 2) for the latter's manipulation. Each handle 6 is a length of heavy gauge wire, having at 7 a 180° bend, so as form parallel spaced legs 8 and 9; said legs 8 and 9 are welded to their respective grid frames 1 and 1' at points 11, 12, 13 and 14, and if desired to one or more of the grid wires at points 15 and 16.

Figure 4:
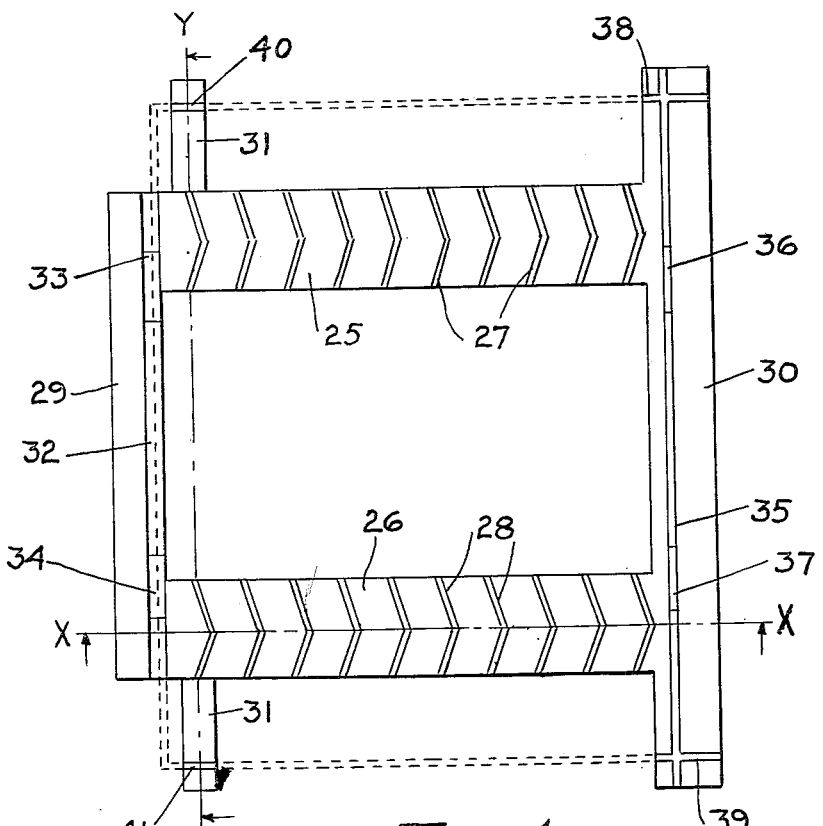
Fig. 4 is a plan view of a single welding jig that can be used for making both of the grids of my improved broiler or toaster.
Figure 5:
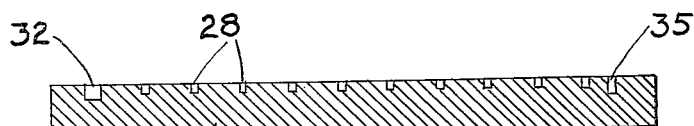
Fig. 5 is a front sectional view taken along section line X—X of Fig. 4, looking in the direction of the arrows.
Figure 6:
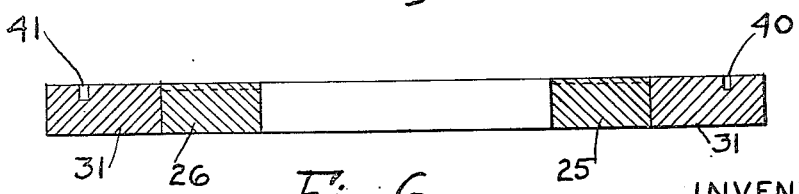
Fig. 6 is a side sectional view taken along section line Y—Y of Fig. 4, looking in the direction of the arrows.

The fact, as pointed out above, that both sets of zigzag wires 3, 3 and 3', 3' are oriented to their respective frame members 1 and 1' in exactly the same fashion makes it possible to construct both grids A and B on one and the same welding jig. This single welding jig, of substantially conventional type is shown in Figs. 4, 5 and 6. The illustrated jig comprises a pair of parallel bars 25 and 26 each having a series of V-shaped or chevron-shaped slots 27 and 28, respectively, along the lengths of the bars. The bars are connected at their opposite ends to crossbars 29 and 30. At a point intermediate their ends, bars 25 and 26 are also connected to crossbar 31. Crossbar 29 has a longitudinal groove 32 adapted to receive one side edge of frame member 1 or 1'. Groove 32 has depressions 33 and 34 which are capable of receiving offsets 20 or 20' of the corresponding frame member. Crossbar 30 also has a groove 35 capable of receiving a side edge of the frame member. Groove 35 likewise has depressions 36 and 37 for receiving the offset portions of the corresponding frame member. Crossbar 30 in addition has slots 38 and 39 which run at right angles to groove 35 and which are adapted to receive the corners of the frame member. Crossbar 31 has transverse slots 40 and 41 which line up with slots 38 and 39 of crossbar 30. Grooves 32 and 35 together with slots 38, 39, 40 and 41 will receive either the frame member 1 or the frame member 1', so as to hold it in place securely. This jig will permit construction of either grill member of my broiler without necessitating any changes in the jig itself.

In order to make the right-hand grill, or grill B of Fig. 1, a frame member 1' is placed in the jig such that its hinge offsets 20' are disposed downwardly in recesses 36 and 37 of groove 35. The gap 2' will be located in groove 32 at the approximate mid-point thereof. A plurality of zigzag members 3' are placed over frame member 1' such that the ends of the zigzags rest on the sides of the frame member and corresponding V sections of the zigzags fit into the V-shaped slots 27 and 28 of bars 25 and 26. The ends of the zigzags are then welded to the frame member. The handle member 6' is then placed over the frame with the curved portion 7' at the left, as viewed in Fig. 4. The handle may then be welded to the frame member and to the individual zigzag members. Grill B is now completed and may be removed from the jig.

Using the same jig for the formation of grill A, a frame member 1 (identical with frame member 1') is placed on the jig such that its hinge offsets 20 are disposed downwardly, not as before in the recesses 36 and 37 of groove 35, but rather in the recesses 33 and 34 of groove 32. Thus the gap 2 of this frame member 1 will lie in the groove 35, midway between recesses 36 and 37. Zigzag members 3 (identical with members 3') are placed over the frame member 1 in the same manner as indicated with respect to frame member 1' and are similarly welded in place. Handle member 6 is placed over the frame member 1 with curved end 7 to the right. The handle member 6 is similarly welded to the frame member 1 and the zigzag members 3. The grill A is now completed. The two grills are connected together now by bending hinges 17 and 18 over the frame members 1 and 1' within the offsets 20 and 20'.

The broiler or toaster shown here admits of obvious modifications; for example, the device as shown is preferably made with handles, but could be made without them; the cross members of the grills are shown as zigzags but could be of any other undulatory form such as sine waves, etc.

My improved two grid broiler or toaster, when made and assembled as above described, provides a very large number of evenly distributed crossings C, C, as above described, between the wires 3, 3 and 3', 3' of its opposed grids A and B, and this despite the fact that all said wires of the two grid members run in the same general direction, i. e. lengthwise of said grid members. This last circumstance makes it possible for a single welding jig, as above described, to serve for the manufacture of both grid members, which makes my two-grid structure much lower in cost than prior two grid structures which obtain an equivalent or comparable number of crossings between their upper and lower sets of grid wires.

I claim:

1. As a new article of manufacture, a two-grid broiler or toaster, comprising first and second equal-size substantially rectangular wire frames, hinge means engaged with opposite sides of said two frames for connecting the two frames together in side-by-side relation, the first frame having a set of identical equally spaced grid wires running in the same direction as said frame's hinged side and all formed in the plane of said frame with matching undulations, and the second frame having a set of identical undulatory grid wires of the same number, configuration, spacing and direction as those of the first frame, said last-named set of grid wires having the same orientation to the second frame's hinged side as have the first-named set of grid wires to the first frame's unhinged side such that the two grids, with respect to their duplicate sets of wires are series connected, whereby upon swinging of said grids upon said hinge means into operative position, one superposed upon the other, each corresponding pair of upper and lower undulatory grid wires are disposed in non-registering out-of-phase relation, so as to make a plurality of crossings with each other.

2. The herein described method of making a two-grid broiler or toaster of the type disclosed by use of a single welding jig, which consists in positioning the first broiler frame's opposite hinged and unhinged sides in correspondingly spaced jig grooves, placing the undulatory grid wires thereon in accordance with the jig's fixed pattern, welding said wires to the ends of said first frame, removing from said jig the so-formed grid, positioning the second broiler frame's sides in said jig grooves in reverse relation, such that its hinged side occupies the groove which received the unhinged side of the first frame, placing the undulatory wires thereon in accordance with the jig's fixed pattern, welding said wires to the ends of said second frame, removing from said jig the so-formed grid and hingedly connecting the hinge sides of the two frames, whereby the two grids, with respect to their duplicate sets of undulatory wires, are connected in series.

References Cited in the file of this patent

UNITED STATES PATENTS

| | | |
|---|---|---|
| D. 164,107 | Doblin | July 31, 1951 |
| 430,401 | Perkins | June 17, 1890 |
| 1,006,254 | Miller | Oct. 17, 1911 |
| 1,693,399 | Nagin | Nov. 27, 1928 |
| 1,908,050 | Reed | May 9, 1933 |
| 1,945,165 | Smith | Jan. 30, 1934 |
| 2,109,724 | Genebach | Mar. 1, 1938 |
| 2,297,825 | Bobo | Oct. 6, 1942 |

FOREIGN PATENTS

| | | |
|---|---|---|
| 363,792 | Great Britain | Dec. 31, 1931 |
| 950,112 | France | Mar. 14, 1949 |